United States Patent
Lee et al.

(10) Patent No.: US 8,964,681 B2
(45) Date of Patent: Feb. 24, 2015

(54) METHOD AND APPARATUS FOR USER SCHEDULING IN MULTI-USER MULTIPLE INPUT MULTIPLE OUTPUT (MIMO) COMMUNICATION SYSTEM

(71) Applicants: Samsung Electronics Co., Ltd., Suwon-si (KR); Korea Advanced Institute of Science and Technology, Daejeon (KR)

(72) Inventors: Byung Moo Lee, Seoul (KR); Byung Chang Kang, Yongin-si (KR); Jun Hyuk Kim, Daegu (KR); Jong Ho Bang, Suwon-si (KR); June Koo Rhee, Daejeon (KR); Jin Hyeock Choi, Suwon-si (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 116 days.

(21) Appl. No.: 13/788,066

(22) Filed: Mar. 7, 2013

(65) Prior Publication Data
US 2013/0286911 A1 Oct. 31, 2013

(30) Foreign Application Priority Data

Apr. 26, 2012 (KR) .................. 10-2012-0043960

(51) Int. Cl.
*H04W 4/00* (2009.01)
*H04W 52/02* (2009.01)
*G08C 17/00* (2006.01)

(52) U.S. Cl.
CPC ............ *H04W 52/0219* (2013.01); *Y02B 60/50* (2013.01)

USPC .......................................... 370/329; 370/311

(58) Field of Classification Search
None
See application file for complete search history.

(56) References Cited

U.S. PATENT DOCUMENTS

| | | | |
|---|---|---|---|
| 8,019,031 B2 | 9/2011 | Yoshida et al. | |
| 8,078,185 B2 * | 12/2011 | Sun et al. ...................... | 455/450 |
| 8,121,567 B2 | 2/2012 | Zheng et al. | |
| 8,693,416 B2 * | 4/2014 | Zheng et al. ................. | 370/329 |
| 8,730,851 B1 * | 5/2014 | Choi et al. .................... | 370/281 |
| 2006/0209764 A1 | 9/2006 | Kim et al. | |
| 2009/0232073 A1 * | 9/2009 | Yan et al. ...................... | 370/329 |
| 2010/0142415 A1 * | 6/2010 | Yu et al. ........................ | 370/279 |
| 2010/0177722 A1 * | 7/2010 | Guvenc ......................... | 370/329 |
| 2010/0304776 A1 | 12/2010 | Wu et al. | |
| 2010/0330922 A1 | 12/2010 | Li et al. | |
| 2011/0205929 A1 * | 8/2011 | Quek et al. .................... | 370/252 |
| 2011/0243081 A1 * | 10/2011 | Liu et al. ....................... | 370/329 |

FOREIGN PATENT DOCUMENTS

| | | |
|---|---|---|
| JP | 2005-509360 A | 4/2005 |
| JP | 2005-237006 A | 9/2005 |
| JP | 2011-101291 A | 5/2011 |
| KR | 10-2005-0058333 A | 6/2005 |
| KR | 10-2008-0039714 A | 5/2008 |
| KR | 10-2009-0101729 A | 9/2009 |
| KR | 10-2011-0013815 A | 2/2011 |

* cited by examiner

*Primary Examiner* — Clemence Han
(74) *Attorney, Agent, or Firm* — NSIP Law

(57) ABSTRACT

A method and apparatus for user scheduling in a multi-user multiple input multiple output (MIMO) communication system are provided. The method includes identifying a user group comprising user terminals. The method further includes comparing power consumptions based on the user group. The method further includes scheduling the user terminals based on the comparing.

20 Claims, 12 Drawing Sheets

METHOD AND APPARATUS FOR USER SCHEDULING IN MULTI-USER MULTIPLE INPUT MULTIPLE OUTPUT (MIMO) COMMUNICATION SYSTEM

CROSS-REFERENCE TO RELATED APPLICATION(S)

This application claims the benefit under 35 U.S.C. §119 (a) of Korean Patent Application No. 10-2012-0043960, filed on Apr. 26, 2012, in the Korean Intellectual Property Office, the entire disclosure of which is incorporated herein by reference for all purposes.

BACKGROUND

1. Field

The following description relates to a user scheduling method and apparatus for energy saving in a transmission apparatus using multiple antennas.

2. Description of Related Art

Globally, the number of Internet users and the number of large data processing services have been increasing. In addition, with the development of a new terminal, such as a smartphone, data traffic has been significantly increasing. Accordingly, there is a desire for energy saving technology in the field of information technology (IT).

In a conventional multiple input multiple output (MIMO) communication system, many user selection methods generally perform channel quality-based user scheduling based on channel information. Such methods may include receiving a feedback from a user terminal, and estimating a channel state.

However, a base station oriented to save power aims to achieve minimum power consumption while satisfying a predetermined level of a data rate or a signal quality. Accordingly, the aim of user scheduling has been changed from the conventional art.

In addition, even though the conventional user scheduling method may include an excellent performance in initial scheduling, scheduling freedom of users to be later serviced may be degraded as data transmission is repeated. Accordingly, it may not be possible to guarantee the excellent performance for the users to be later serviced.

SUMMARY

In one general aspect, there is provided a scheduling method including identifying a user group including user terminals. The method further includes comparing power consumptions based on the user group. The method further includes scheduling the user terminals based on the comparing.

The user group may correspond to a time slot of a frame for transmission of data to the user terminals.

The comparing may include comparing a power consumption of the identified user group with a power consumption of a modified user group in which a user terminal is replaced in the identified user group.

The scheduling may include updating the identified user group with the modified user group if the power consumption of the modified user group is less than the power consumption of the identified user group.

The scheduling may further include setting a flag associated with a group update if the identified user group is updated with the modified user group.

In another general aspect, there is provided a scheduling method including determining a transmission power to provide data to a user terminal within a coverage area of a base station. The method further includes selecting a user group including user terminals. The method further includes scheduling the user terminals based on the user group that minimizes the transmission power.

The scheduling may include comparing a power consumption of the selected user group with a power consumption of a modified user group in which a user terminal is replaced in the selected user group.

The scheduling may further include updating the selected user group with the modified user group if the power consumption of the modified user group is less than the power consumption of the selected user group.

In still another general aspect, there is provided a scheduling apparatus including a group identifier configured to identify a user group including user terminals. The apparatus further includes a scheduler configured to compare power consumptions based on the user group, and schedule the user terminals based on the comparison.

The scheduler may be further configured to compare a power consumption of the identified user group with a power consumption of a modified user group in which a user terminal is replaced in the identified user group.

The scheduler may be further configured to update the identified user group with the modified user group if the power consumption of the modified user group is less than the power consumption of the identified user group.

The scheduler may be further configured to set a flag associated with a group update if the identified user group is updated with the modified user group.

The scheduling apparatus may be included in a base station.

In yet another general aspect, there is provided a scheduling apparatus including a transmission power determining unit configured to determine a transmission power to provide data to a user terminal within a coverage area of a base station. The apparatus further includes a scheduler configured to select a user group including user terminals, and schedule the user terminals based on the user group that minimizes the transmission power.

The scheduler may be further configured to compare a power consumption of the selected user group with a power consumption of a modified user group in which a user terminal is replaced in the selected user group.

The scheduler may be further configured to update the selected user group with the modified user group if the power consumption of the modified user group is less than the power consumption of the selected user group.

Other features and aspects will be apparent from the following detailed description, the drawings, and the claims.

Figure 1:
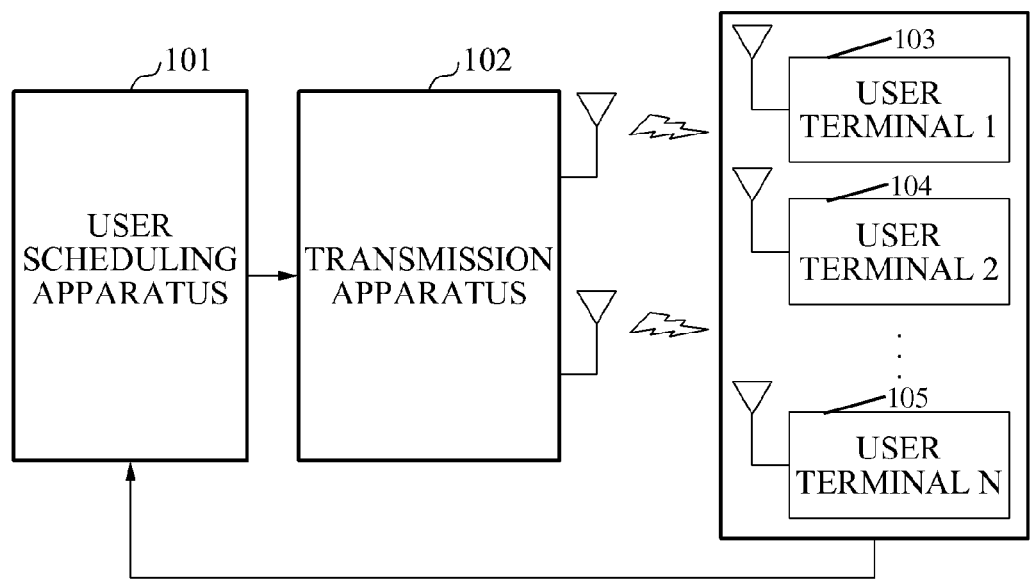
FIG. 1 is a block diagram illustrating an example of a user scheduling method.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, description of well-known functions and constructions may be omitted for increased clarity and conciseness.

FIG. 1 is a block diagram illustrating an example of a user scheduling method. Referring to FIG. 1, a user scheduling apparatus 101 performs user scheduling to save energy or power in a transmission apparatus 102 (e.g., a base station) using multiple antennas. For example, the user scheduling described herein may use an inter-slot user grouping considering a current time subsequent times.

In more detail, the user scheduling apparatus 101 provides a power saving user selection method in a multi-user multiple input multiple output (MIMO) downlink transmission system. The transmission apparatus 102 includes the antennas. The user scheduling apparatus 101 may be included in the transmission apparatus 102, or may be independently provided.

The user scheduling apparatus 101 receives or is fed back with a downlink channel state from each of user terminals 103, 104, and 105 within a coverage area of the transmission apparatus 102. The user scheduling apparatus 101 selects, from the user terminals 103, 104, and 105, a user terminal to be serviced (i.e., to communicate with the transmission apparatus 102) at a current point in time. The user scheduling apparatus 101 sets or determines data to be transferred to the user terminals 103, 104, and 105 via external interfaces at the current point in time. Namely, the transmission apparatus 102 transmits the data to the selected user terminal via the antennas at the current point in time.

In even more detail, in the multi-user MIMO communication system, the user terminals 103, 104, and 105 use a service with the same time resource or the same frequency resource. The user scheduling apparatus 101 groups user terminals (e.g., the user terminals 103, 104, and 105) to be serviced within a frame. To do so, the user scheduling apparatus 101 generates time slots of the frame for transmission of data to each of the grouped user terminals, respectively. The user scheduling apparatus 101 minimizes a power consumption (i.e., an amplifying power) of the transmission apparatus 102 to be within a range in which a quality of service (QoS) required by each of the grouped user terminals is satisfied.

In the multi-user MIMO communication system, the transmission apparatus 102 may transmit a signal y to each of the user terminals 103, 104, and 105 based on the example of Equation 1.

$$y = H\beta FPx + n \qquad (1)$$

$$\beta = \frac{1}{\|F\|_F}$$

$$P = \begin{bmatrix} \sqrt{P_1} & \cdots & 0 \\ \vdots & \ddots & \vdots \\ 0 & \cdots & \sqrt{P_K} \end{bmatrix}$$

Referring to Equation 1, the transmission apparatus 102 may apply P to data x to be transmitted to the user terminals 103, 104, and 105 using a time slot. For example, P may include a power control parameter set or determined for each of the user terminals 103, 104, and 105. The transmission apparatus 102 may further apply a precoding matrix F to the data x so that the user terminals 103, 104, and 105 may receive the data x without interference. The transmission apparatus 102 may multiply the data x by a parameter $\beta$, and may transmit the final signal y to an antenna of each of the user terminals 103, 104, and 105 via a channel H formed between the transmission apparatus 102 and each of the user terminals 103, 104, and 105.

In Equation 1, $\beta$ denotes the parameter to offset a power gain by the precoding matrix F, and P denotes the power control parameter corresponding to each of the user terminals 103, 104, and 105. A diagonal element of the power control parameter P may include a square root of an amplifying power set or determined for a corresponding user terminal. $\|A\|_F$ denotes a Frobenius norm operator and a square root of a value determined by adding up squares of absolute values of elements included in a matrix A, and n denotes a noise component.

The precoding matrix F may be generated based on a zero-forcing beamforming scheme that is one of beamforming schemes of the MIMO communication system. The precoding matrix F generated based on the zero-forcing beamforming scheme may be expressed by the example of Equation 2.

$$F = H^*(HH^*)^{-1} \quad (2)$$

In Equation 2, H denotes the channel formed between the transmission apparatus 102 and each of the user terminals 103, 104, and 105. H* denotes a conjugate transpose when H is a matrix including a complex element, and $A^{-1}$ denotes an inverse matrix of the matrix A.

In the multi-user MIMO communication system, a combination result of Equation 1 that is a vector of the signal y and Equation 2 that is the precoding matrix F of the zero-forcing beamforming scheme may be expressed by the example of Equation 3.

$$\begin{aligned} y &= H\beta FPx + n \\ &= H\beta H^*(HH^*)^{-1}Px + n \\ &= \beta Px + n \end{aligned} \quad (3)$$

When the signal y of Equation 3 is generated for each of the user terminals 103, 104, and 105, a signal $y_k$ received by each of the user terminals 103, 104, and 105 may be expressed by the example of Equation 4.

$$y_k = \beta\sqrt{P_k}x_k + n_k, k \in \{\text{all the users communicating with base station}\} \quad (4)$$

In Equation 4, k denotes an index of an element of a set of all user terminals communicating with the transmission apparatus 102, for example, a base station. In this example, noise may be very small in a signal-to-noise ratio (SNR) for a $k^{th}$ user terminal. In addition, an average energy of the data x may be a value of 1. For example, the average energy may be expressed by $E[xx^*]=1$. In this example, $E[\ ]$ denotes an expectation value within H.

The SNR $\gamma_{k,dB}$ for the $k^{th}$ user terminal may be expressed by the example of Equation 5.

$$\gamma_{k,dB} = (P_k\beta^2)_{dB} - (n_k^2)_{dB} \quad (5)$$

In Equation 5, $\gamma_{k,dB}$ denotes the SNR for the $k^{th}$ user terminal that is converted based on a decibel unit. In this example, all of the user terminals may include the statistically same level of a noise or thermal noise component. Further, $P_k\beta^2$ ($=P_k/\|H^*(HH^*)^{-1}\|_F^2$) determined by converting $(P_k\beta^2)_{dB}$, excluding a power component of the noise component, based on a real number unit, may be defined as a relative signal ratio $\gamma_k$ between the $k^{th}$ user terminal and remaining user terminals excluding the $k^{th}$ user terminal.

For example, when the same level of a signal quality is supported with respect to a user terminal a and a user terminal b, a relative signal ratio $\gamma_a$ between the user terminal a and the remaining user terminals may be greater than a relative signal ratio $\gamma_b$ between the user terminal b and the remaining user terminals by two folds. This may indicate that a power consumption of a signal transmitted to the user terminal a is greater than a power consumption of a signal transmitted to the user terminal b by two folds.

That is, the relative signal ratio $\gamma_k$ may be proportional to a strength or power of a signal to be transmitted to or received by the $k^{th}$ user terminal. The relationship between the relative signal ratio $\gamma_k$ between the $k^{th}$ user terminal and the remaining user terminals excluding the $k^{th}$ user terminal, and a power control parameter $P_k$ may be expressed by the example of Equation 6.

$$P_k = \gamma_k \times \|H^*(HH^*)^{-1}\|_F^2, k \in \{\text{all the users communicating with base station}\} \quad (6)$$

In Equation 6, $\gamma_k$ denotes the strength of the relative signal, and k denotes the index of the element of the set of all the user terminals communicating with the transmission apparatus 102. To service the $k^{th}$ user terminal including the relative signal ratio $\gamma_k$, a power of the power control parameter $P_k$ may be used. H denotes a channel formed when the $k^{th}$ user terminal communicates with the transmission apparatus 102. For example, channel formation with a user terminal may be performed based on a maximum number of transmit antennas installed in the transmission apparatus 102.

When a frame period is N and the channel states of the user terminals to be serviced are known, the user scheduling apparatus 101 may group the user terminals capable of satisfying the example of Equation 7.

$$\text{minimize}\left\{\sum_{n \in \{1,\ldots,N\}} \sum_{k \in \kappa_n} \gamma_k \times \|H^*_{\kappa_n}(H_{\kappa_n}H^*_{\kappa_n})^{-1}\|_F^2\right\} \quad (7)$$

In Equation 7, an index n of a time slot indicates all time slots up to the frame period N. $\kappa_n$ denotes a set of the user terminals to be serviced or to be included in a channel in an $n^{th}$ time slot, and $H_{\kappa_n}$ denotes a channel matrix formed by the set $\kappa_n$ in the $n^{th}$ time slot.

Figure 2:
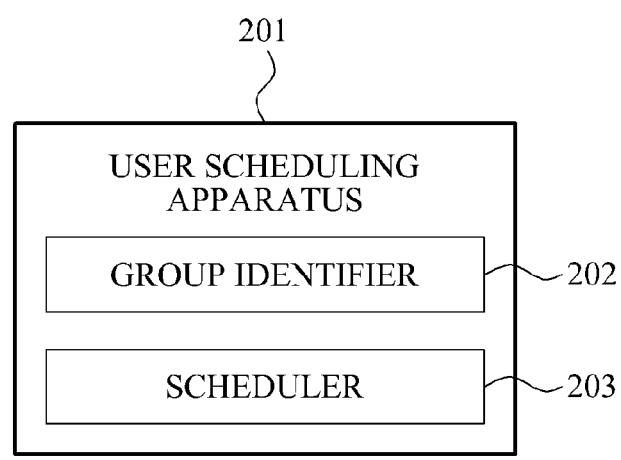
FIG. 2 is a block diagram illustrating an example of a user scheduling apparatus.
Figure 4:
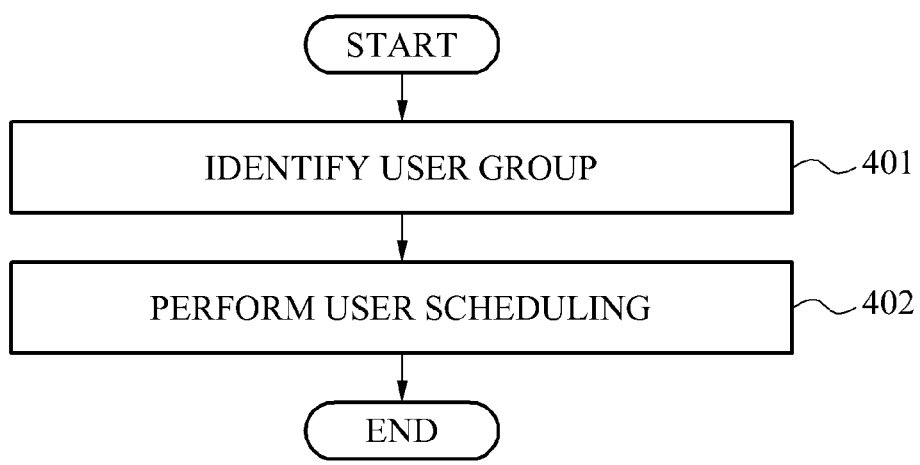
FIG. 4 is a flowchart illustrating an example of a user scheduling method.

FIG. 2 is a block diagram illustrating an example of a user scheduling apparatus 201. FIG. 4 is a flowchart illustrating an example of a user scheduling method. Referring to FIG. 2, the user scheduling apparatus 201 includes a group identifier 202 and a scheduler 203. The user scheduling apparatus 201 of FIG. 2 performs the user scheduling method of FIG. 4.

In operation 401, the group identifier 202 identifies a user group including user terminals among all user terminals using a service. That is, the group identifier 202 identifies or selects the user group, which may be predetermined and among multiple user groups, corresponding to a time slot of a frame for transmission of data from a transmission apparatus to the user terminals.

In operation 402, the scheduler 203 performs user scheduling (i.e., schedules the user terminals) based on the identified user group. That is, the scheduler 203 compares a power consumption of (i.e., an amplifying power of the transmission apparatus to transmit the data to) the identified user group with a power consumption of a modified user group in which a user terminal is replaced in the identified user group. When the power consumption of the modified user group is less than the power consumption of the identified user group, the scheduler 203 updates the identified user group with the modified user group. When the identified user group is updated with the modified user group, the scheduler 203 sets a flag associated with a group update.

Figure 3:
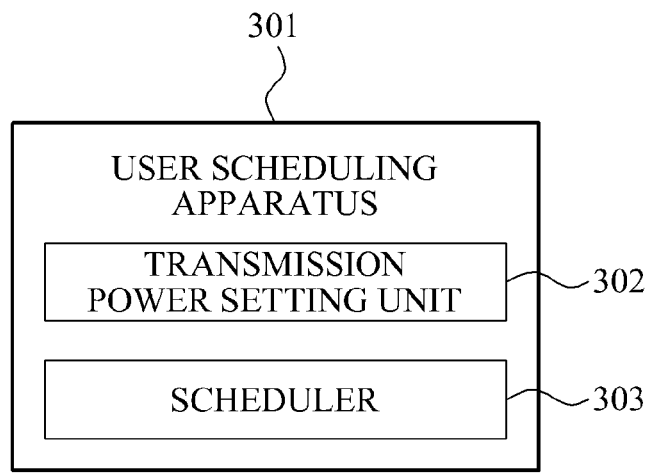
FIG. 3 is a block diagram illustrating another example of a user scheduling apparatus.
Figure 5:
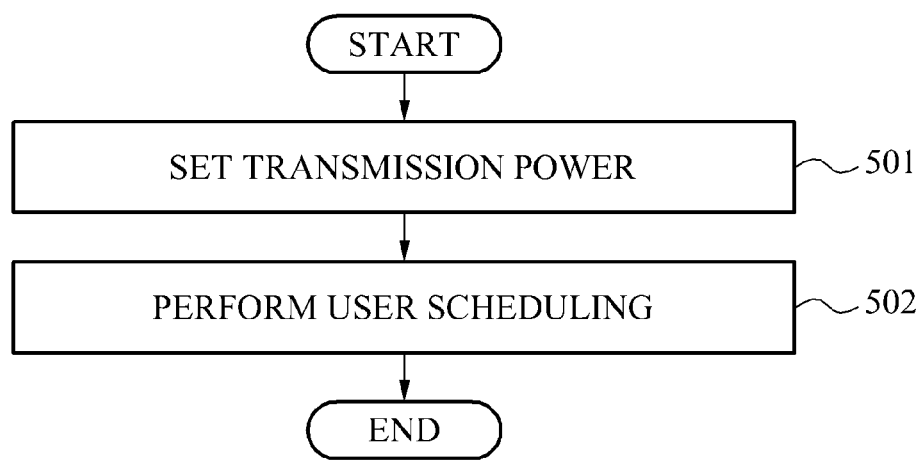
FIG. 5 is a flowchart illustrating another example of a user scheduling method.

FIG. 3 is a block diagram illustrating another example of a user scheduling apparatus 301. FIG. 5 is a flowchart illustrating another example of a user scheduling method. Referring to FIG. 3, the user scheduling apparatus 301 includes a transmission power setting unit 302 (i.e., a transmission power determining unit) and a scheduler 303. The user scheduling apparatus 301 of FIG. 3 performs user scheduling method of FIG. 5.

In operation 501, the transmission power setting unit 302 sets or determines a transmission (i.e., amplifying) power of a transmission apparatus (e.g., the transmission apparatus 102 of FIG. 1) to service each user terminal satisfying a target signal quality within a coverage area of the transmission apparatus. For example, the target signal quality may be determined based on Equation 5, and the transmission power may be determined based on Equation 6.

In operation 502, the scheduler 303 performs user scheduling (i.e., schedules user terminals) based on the set transmission power. That is, the scheduler 303 selects a user group including the user terminals among all user terminals using a service to minimize the set transmission power. The user group may be predetermined and among multiple user groups, and corresponds to a time slot of a frame for transmission of data from a transmission apparatus to the user terminals.

In this example, the scheduler 303 further compares a power consumption (e.g., the set transmission power) of the selected user group with a power consumption of a modified user group in which a user terminal is replaced in the selected user group. When the power consumption of the modified user group is less than the power consumption of the selected user group, the scheduler 303 updates the selected user group with the modified user group. When the selected user group is updated with the modified user group, the scheduler 303 sets a flag associated with a group update.

Figure 6:
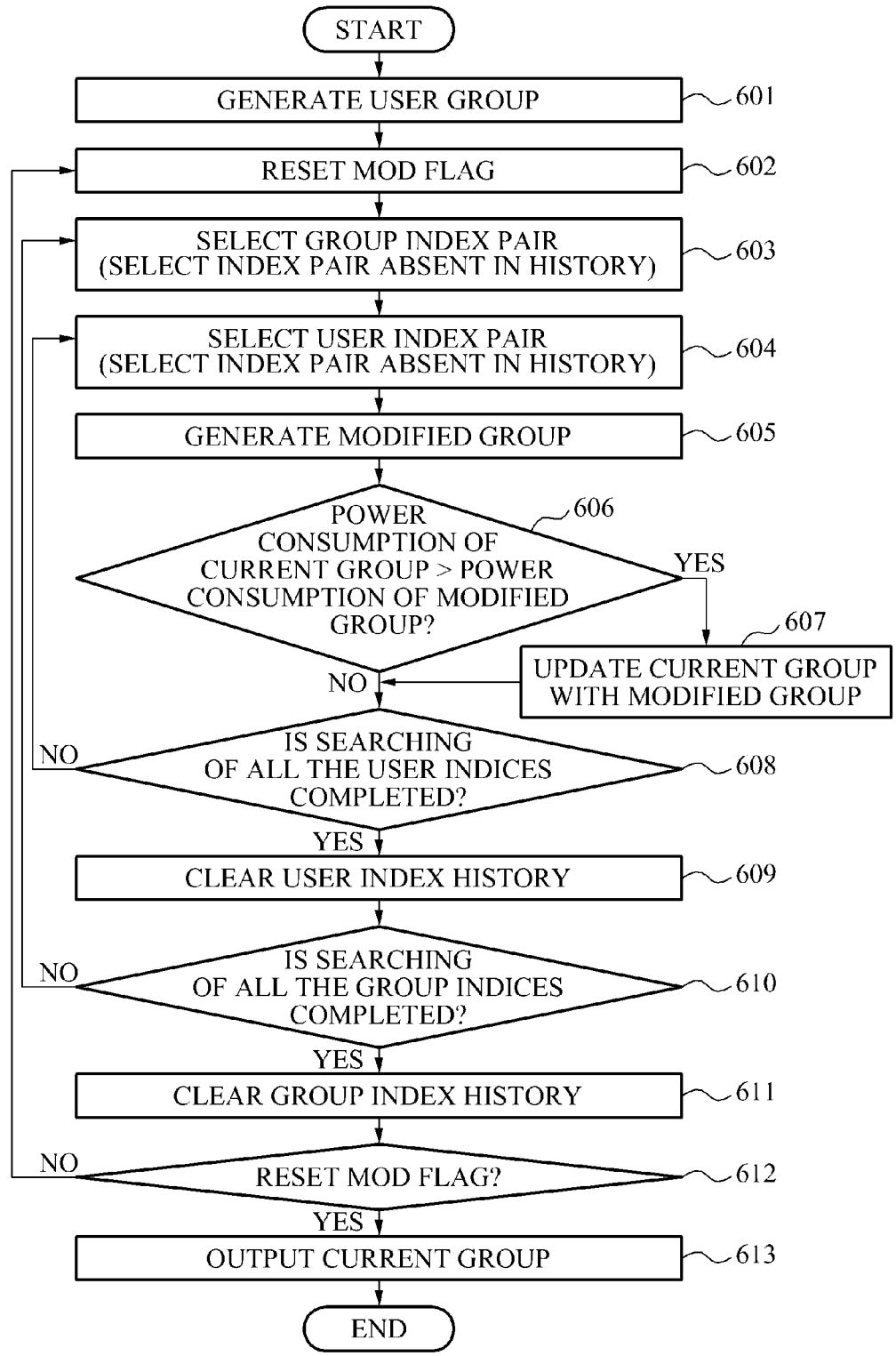
FIG. 6 is a flowchart illustrating still another example of a user scheduling method.

FIG. 6 is a flowchart illustrating still another example of a user scheduling method. In operation 601, a user scheduling apparatus performs an initialization process to generate at least one user group including user terminals among all user terminals using a service. In more detail, during the initialization process, the user scheduling apparatus generates a scheduled user group (SUG) in which a number of rows is a frame period and a number of columns is a maximum number of user terminals serviceable in a single time slot. The SUG may be expressed as a matrix. The user scheduling apparatus generates the SUG to include all of the user terminals to be serviced in a frame based on a predetermined rule. The SUG matrix will be further described with reference to FIG. 7 below.

In operation 602, the user scheduling apparatus resets a method of destruction (MOD) flag. The MOD flag will be further described later.

In operation 603, the user scheduling apparatus selects a pair of group indices with respect to the SUG matrix. A group index indicates a user group in the SUG matrix. One of the pair of the group indices indicates a previously-identified user group, and another one of the pair of the group indices indicates a current user group. The user scheduling method includes searching for all pairs of the group indices with respect to the SUG matrix. Accordingly, the user scheduling apparatus selects the pair of the group indices that is absent in a group index history of selected pairs of the group indices, i.e., a new pair of the group indices.

In operation 604, the user scheduling apparatus selects a pair of user indices associated with the selected pair of the group indices, respectively. The user scheduling method includes searching for all pairs of the user indices associated with the pair of the group indices, respectively. Accordingly, the user scheduling apparatus selects the pair of the user indices that is absent in a user index history of selected pairs of the user indices, i.e., a new pair of the user indices.

In operation 605, based on the selected pair of the group indices, the user scheduling apparatus sets or determines the previously-identified user group as the current user group. The user scheduling apparatus further generates, as a modified user group, a user group in which a user terminal of the current user group is replaced based on the selected pair of the user indices.

In operation 606, the user scheduling apparatus compares a power consumption of the current user group and a power consumption of the modified user group. When the power consumption of the current user group is greater than the power consumption of the modified user group, in operation 607, the user scheduling apparatus updates the current user group with the modified user group. The user scheduling apparatus sets or determines the MOD flag associated with group update. The MOD flag indicates that the SUG matrix is modified.

On the contrary, when the power consumption of the current user group is less than the power consumption of the modified user group, in operation 608, the user scheduling apparatus determines how far a comparison method of power consumptions of the user groups has proceeded with respect to all of the pairs of the user indices associated with the selected pair of the group indices. When searching of all of the pairs of the user indices is not completed, the user scheduling apparatus returns to operation 604, and performs the above method with respect to another pair of user indices.

On the contrary, when searching of all of the pairs of the user indices is completed, in operation 609, the user scheduling apparatus clears the user index history. For example, the user index history indicates the pairs of the user indices that have been searched to a current point in time.

In operation 610, the user scheduling apparatus determines whether searching is completed with respect to all of the pairs of the group indices corresponding to the user groups in the SUG matrix. When searching is not completed with respect to all of the pairs of the group indices, the user scheduling apparatus returns to operation 603, and perform the above method with respect to another pair of group indices.

On the contrary, when searching is completed with respect to all of the pairs of the group indices, in operation 611, the user scheduling apparatus clears the group index history. For example, the group index history indicates the pairs of the group indices that have been searched to a current point in time. A method of storing or registering a user index and a group index in the respective histories may be performed to perform comparisons between all of the user indices and comparisons between all of the group indices, respectively, without overlapping.

In operation 612, the user scheduling apparatus detects a state of the MOD flag. When the MOD flag is set, it indicates that the SUG matrix has been modified at least once during the aforementioned operations. For example, while determining, through comparison, whether the power consumption of the current group is optimal compared to the power consumption of the modified group with respect to all of the pairs of the user indices, the SUG matrix may be modified. Therefore, a change may occur in a power comparison operation within history before a final modification. Accordingly, when the MOD flag is set, in operation 602, the user scheduling apparatus may perform searching again by resetting the MOD flag without finishing. That is, the MOD flag indicates that the SUG matrix is modified while determining whether the SUG matrix of a current point in time is optimal through comparison between all of the user indices. Thus, the user scheduling apparatus may reset the MOD flag in operation 602, and may perform searching again with respect to all of the group indices.

When the MOD flag is reset, it indicates that the SUG matrix is not modified during the comparison between all of the user indices, and also indicates that the SUG matrix of the current point in time is an optimal scheduling result with respect to the user terminals. When the MOD flag is reset, in operation 613, the user scheduling apparatus outputs the current user group corresponding to the optimal SUG matrix. Through the above method, the user scheduling apparatus may satisfy a communication quality of a user terminal, and may also minimize a power consumption of a multi-user MIMO communication system.

Figure 7:
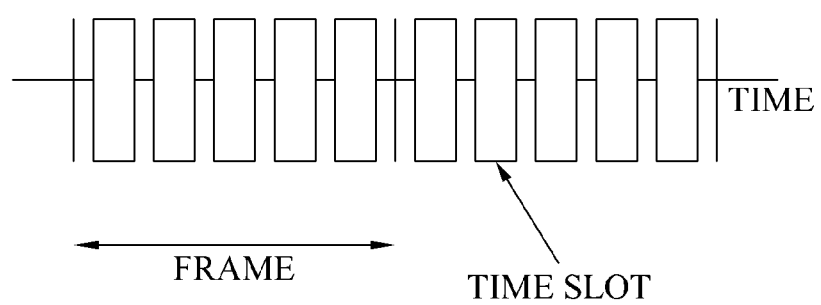
FIG. 7 is a diagram illustrating an example of a frame and time slots.

FIG. 7 is a diagram illustrating an example of a frame and time slots. The frame corresponds to all user terminals to be serviced. A single time slot corresponds to a plurality of the user terminals. The single frame includes a plurality of time slots.

An SUG matrix indicates a set $\kappa_n$ of the user terminals be serviced in an $n^{th}$ time slot among all of the user terminals to be serviced in the frame. Elements included in the same row within the SUG matrix are defined as a single user group. That is, the elements belonging to the same row also belong to the same user group. The elements within the single user group are grouped to be serviced within the same time slot.

For example, when a frame period N equals 4 (time units or slots), four antennas are installed in a transmission apparatus, and 16 user terminals are grouped and scheduled within the frame period, a SUG matrix may be expressed by the example of Equation 8.

$$SUG = \begin{pmatrix} 1 & 13 & 14 & 9 \\ 8 & 15 & 3 & 12 \\ 11 & 4 & 7 & 2 \\ 5 & 16 & 6 & 10 \end{pmatrix} \qquad (8)$$

Referring to Equation 8, a user scheduling apparatus may select user terminals 1, 13, 14, and 9 in a first time slot of a frame, and may select user terminals 8, 15, 3, and 12 in a second time slot of the frame. The user scheduling apparatus may select user terminals 11, 4, 7, and 2 in a third time slot of the frame, and may select user terminals 5, 16, 6, and 10 in a fourth time slot of the frame.

A column value of a predetermined user group (e.g., a user row) in the SUG matrix is defined as a user index. The user index indicates a user terminal within the user group. When there is no user terminal to be serviced in the user index, the user index may be indicated as null $\phi$.

A user scheduling method includes modifying the SUG matrix based on a comparison result of power consumptions of a pair of the user groups while sequentially exchanging all user indices with respect to all of the user groups. Accordingly, when the SUG matrix is modified at least once while a loop is performed using the user scheduling method, the user scheduling apparatus sets a MOD flag.

The user scheduling apparatus performs searching associated with comparisons of power consumptions of all pairs of the user groups included in the SUG matrix. When searching is completed, the user scheduling apparatus verifies the MOD flag, and determines whether to search the pairs of the user groups from the start.

According to examples, there is provided a method of selecting a user terminal for a user group to save power in a multi-user MIMO communication system. When identifying the user group, the same SUG matrix as one generated by an exhaustive search may be output even though the exhaustive search is not performed. The method of performing the exhaustive search in order to find the SUG matrix satisfying Equation 7 may use a comparison operation as shown in the example of Equation 9.

$$\text{num of compare} = C_{n(\kappa_1)}^{n(\kappa)} \times C_{n(\kappa_2)}^{n(\kappa-\kappa_1)} \times \ldots \times C_{n(\kappa_N)}^{n(\kappa-(\kappa_1+\kappa_2+\ldots+\kappa_{N-1}))} \qquad (9)$$

In Equation 9, $n(\kappa)$ denotes a number of all user terminals to be serviced within a frame, N denotes a frame period, that is, a number of time slots, $n(\kappa_i)$ denotes a number of user terminals to be scheduled in an $i^{th}$ time slot, and $C_k^n$ denotes a number of combinations to select k elements from among n elements. According to Equation 9, the scheduling method may be inappropriate for a communication system requiring instantaneous calculation.

However, the user scheduling method described in operations 602 through 612 of FIG. 6 determines whether the SUG matrix is modified based on a MOD flag with respect to all pairs of user indices associated with all pairs of group indices. The user scheduling method may use about $\{n(\kappa)\}^2$ comparison operations to perform the same method of FIG. 6 once. This is because the user scheduling method of comparing power consumptions between an element $s_{i,j}$ in the SUG matrix and all remaining elements excluding the element $s_{i,j}$ in the same user group is performed. In this example, $s_{i,j}$ denotes a $j^{th}$ user index in an $i^{th}$ time slot. That is, the user scheduling method may repeat about $\{n(\kappa)\}^2$ operations until the MOD flag is reset in operation 612. As described above, when a number of operation iterations increases in operations 602 through 612, it may be difficult to apply the method of FIG. 6 to an actually operating system. Accordingly, it is possible to fix the number of operation iterations.

Figure 8:
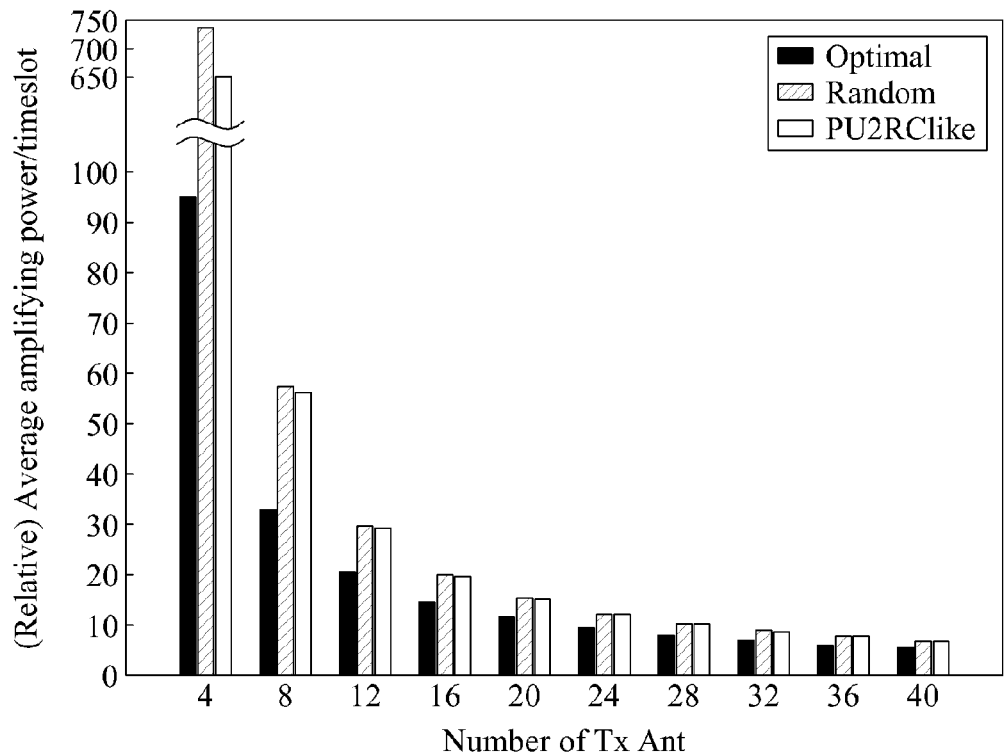
FIG. 8 is a graph illustrating an example of a comparison result of an average power consumption when a number of antennas installed in a transmission apparatus increases by multiples of four.

FIG. 8 is a graph illustrating an example of a comparison result of an average power consumption when a number of antennas installed in a transmission apparatus increases by multiples of four. The graph of FIG. 8 shows a simulation result in an environment similar to a cell of a multi-user MIMO communication system. For example, in FIG. 8, the number ("$N_{tx}$") of antennas ("Tx Ant") installed in the transmission apparatus is a multiple of four, with a minimum number of four and a maximum number of 40, and a total number of 40 user terminals are assigned to ten time slots in a frame.

In the graph of FIG. 8, a relative average amplifying power per time slot $$\sum_{n \in \{1, \ldots, N\}} \sum_{k \in \kappa_n} \gamma_k \times \|H_{\kappa_n}^* (H_{\kappa_n} H_{\kappa_n}^*)^{-1}\|_F^2$$

of a power required for transmission of data is compared using optimal scheduling, random scheduling, and per-user unitary rate control (PU2RC) like scheduling with reference to Equation 7. For example, the PU2RC like scheduling indicates a user selection scheme of initially servicing a user terminal indicating a high data rate. That is, the PU2RC like scheduling indicates a scheme of selecting a user, starting with a user including a relatively excellent channel state.

The average amplifying power is determined based on a total of 1000 tests, and the user terminals are equally distributed within the same cell. In addition, a correlation-based Rayleigh fading channel is employed, a Hata power attenuation model is employed, and a target SNR of the user terminals is zero dB.

The graph of FIG. 8 shows the comparison result with respect to an absolute value of the average amplifying power, and thus, expresses the comparison result based on an arbitrary unit. A multi-antenna system including $N_{tx}$ antennas installed in the transmission apparatus and a single antenna installed in each user terminal is used. In this example, a narrowband statistical MIMO channel H may be expressed based on the example of Equation 10.

$$H = \Re_R^{1/2} H_w \Re_T^{1/2} \qquad (10)$$

In Equation 10, $\Re_R$ denotes a correlation matrix between antennas of a reception apparatus, $\Re_T$ denotes a correlation matrix between the antennas of the transmission apparatus, and $H_w$ denotes an independent, identically distributed (i.i.d) Rayleigh fading channel.

A correlation between an $i^{th}$ antenna and a $j^{th}$ antenna that are elements of the correlation matrix $\Re_T$ may be modeled to the example of Equation 11.

[Equation 11]

$$\rho_{i,j} = \begin{cases} a \times \left(\frac{N_t - |i-j|}{N_t}\right) \times e^{\left\{b \times \left(\frac{N_t-(N_t-|i-j|)}{N_t}\right) \times j\pi\right\}} & \text{as } i \neq j \\ 1 & \text{as } i = j \end{cases}$$

$i, j \in \{1, \ldots, N_t\}$

In Equation 11, $N_t$ denotes the number of antennas installed in the transmission apparatus, a denotes an amplitude correlation adjustment element, and b denotes a phase correlation adjustment element. Each of the elements a and b may include a real number value between a minimum value of 0 and a maximum value of 1, and an antenna correlation may be adjusted to increase or decrease based on the elements a and b.

In an actual environment, when the element a includes a great value, an interval between antennas is narrow, and when the element a includes a small value, an interval between the antennas is great. In addition, a correlation within a cell may vary based on a position of a user by assuming each of the elements a and b as a random real number. Unless values of the elements a and b are mentioned in the simulation, the values of a and b may include an equivalent distribution between 0 and 1. In this example, a Monte-Carlo simulation scheme may be employed.

In the graph of FIG. 8, a horizontal axis denotes the number of antennas installed in the transmission apparatus, and a vertical axis denotes the average amplifying power $$\sum_{k \in \kappa_n} \gamma_k \times \left\| H^*_{\kappa_n} (H_{\kappa_n} H^*_{\kappa_n})^{-1} \right\|^2_F$$

required in a single time slot within the frame. In each scheduling scheme, the power consumption is in inverse proportion to the number of antennas.

Figure 9:
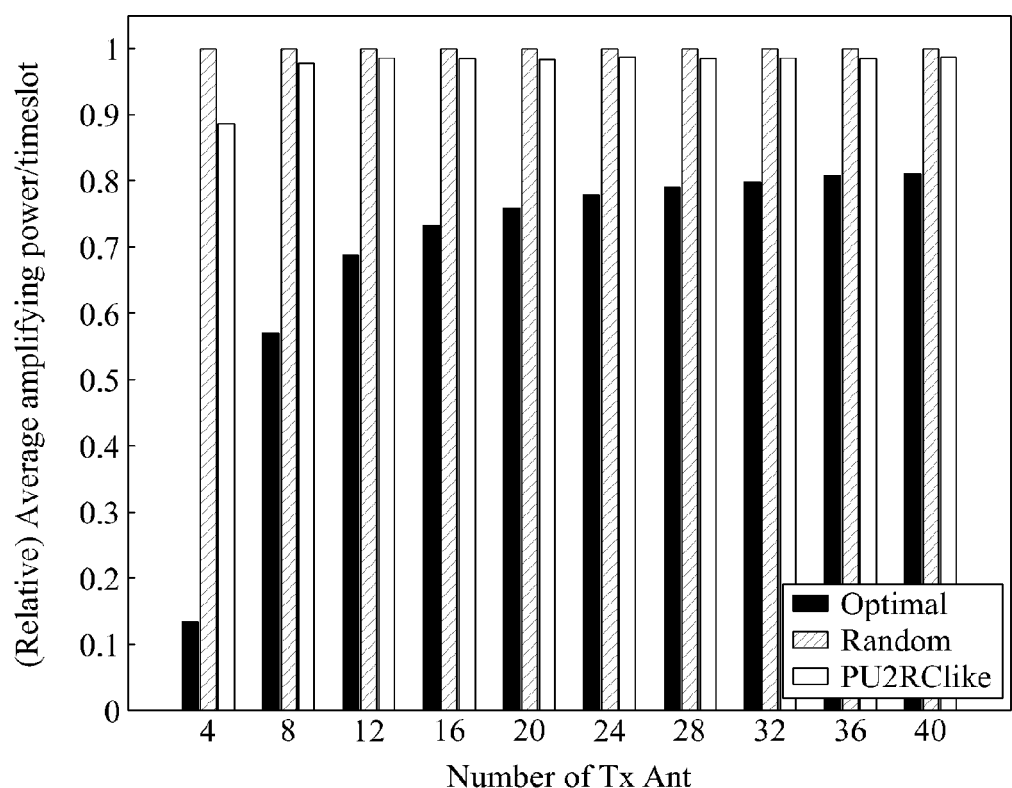
FIG. 9 is a graph illustrating an example of a comparison result with respect to a saving rate of an average power consumption when a number of antennas installed in a transmission apparatus increases by multiples of four.

FIG. 9 is a graph illustrating an example of a comparison result with respect to a saving rate of an average power consumption when a number of antennas installed in a transmission apparatus increases by multiples of four. When other conditions are the same as those of the graph of FIG. 8, the saving rate of the average power consumption increases as the number of antennas increases.

Figure 10:
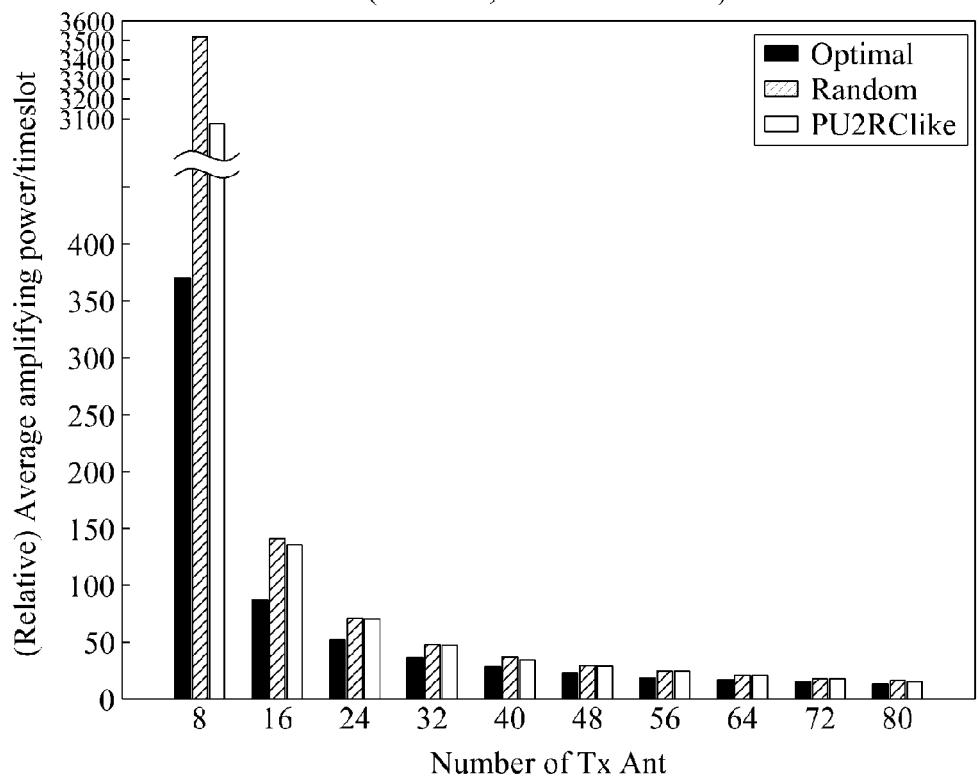
FIG. 10 is a graph illustrating an example of a comparison result of an average power consumption when a number of antennas installed in a transmission apparatus increases by multiples of eight.
Figure 11:
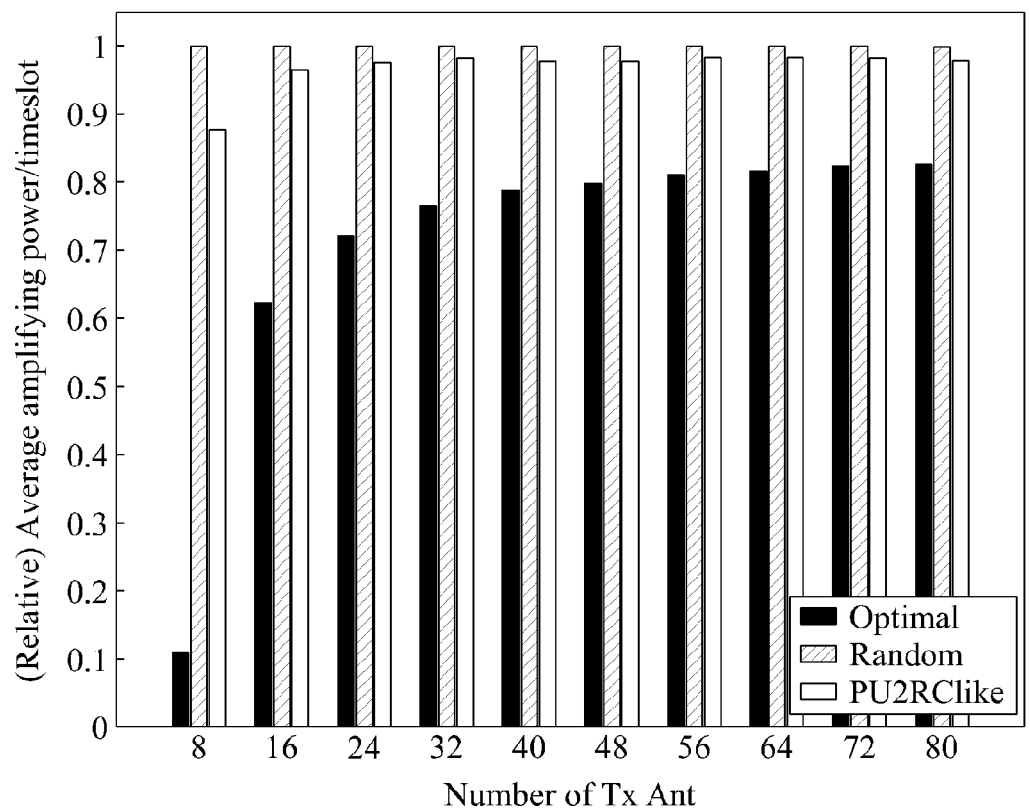
FIG. 11 is a graph illustrating an example of a comparison result with respect to a saving rate of an average power consumption when a number of antennas installed in a transmission apparatus increases by multiples of eight.

FIG. 10 is a graph illustrating an example of a comparison result of an average power consumption when a number of antennas installed in a transmission apparatus increases by multiples of eight. FIG. 10 shows an average amplifying power determined by increasing a number of serviceable user terminals to eight in a time slot when the number of antennas installed in the transmission apparatus increases from eight by multiples of eight in the same experimental environment as FIG. 8. FIG. 11 shows a normalized power use ratio based on the number of antennas installed in the transmission apparatus in the graph of FIG. 10, as described herein.

FIG. 11 is a graph illustrating an example of a comparison result with respect to a saving rate of an average power consumption when a number of antennas installed in a transmission apparatus increases by multiples of eight. FIG. 11 shows an antenna correlation of the transmission apparatus and an energy saving rate that are described above with reference to Equation 10.

Figure 12:
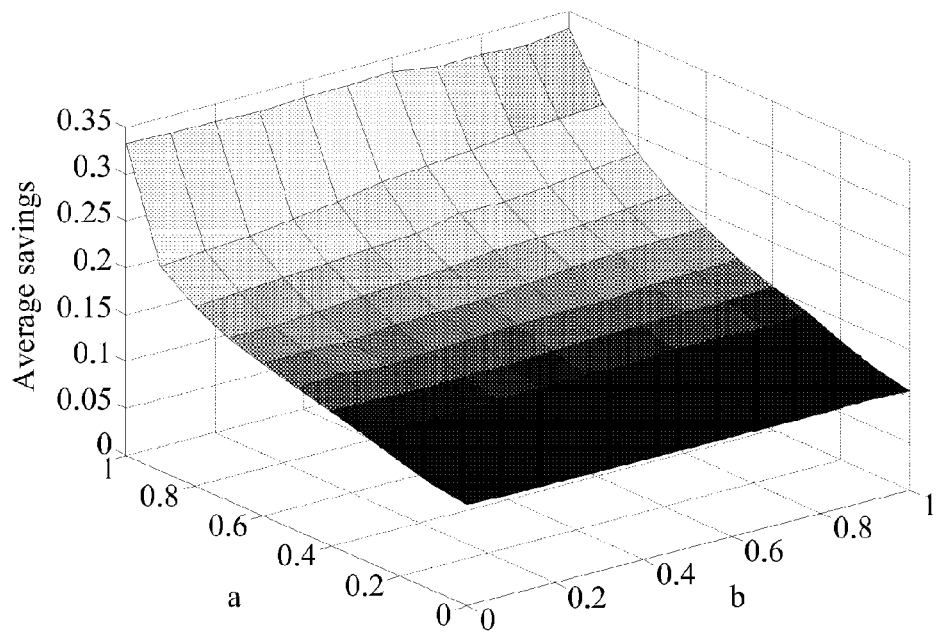
FIG. 12 is a graph illustrating an example of a comparison result with respect to a saving rate of a power consumption based on a change in a correlation matrix between antennas installed in a transmission apparatus.

FIG. 12 is a graph illustrating an example of a comparison result with respect to a saving rate of a power consumption based on a change in a correlation matrix between antennas installed in a transmission apparatus. In more detail, FIG. 12 shows an average power saving rate of optimal scheduling compared to random scheduling while changing values of elements a and b of Equation 11. The power saving rate increases as the value of the element a increases. When fixing the value of the element a, there is no great difference. However, as the value of the element b increases, a greater power saving rate may be determined based on power scheduling, i.e., optimal scheduling or random scheduling, that is used. That is, when fixing the value of the element a, there is no big difference, but the power saving rate is greatly affected by the used power scheduling as the value of the element b increases.

Figure 13:
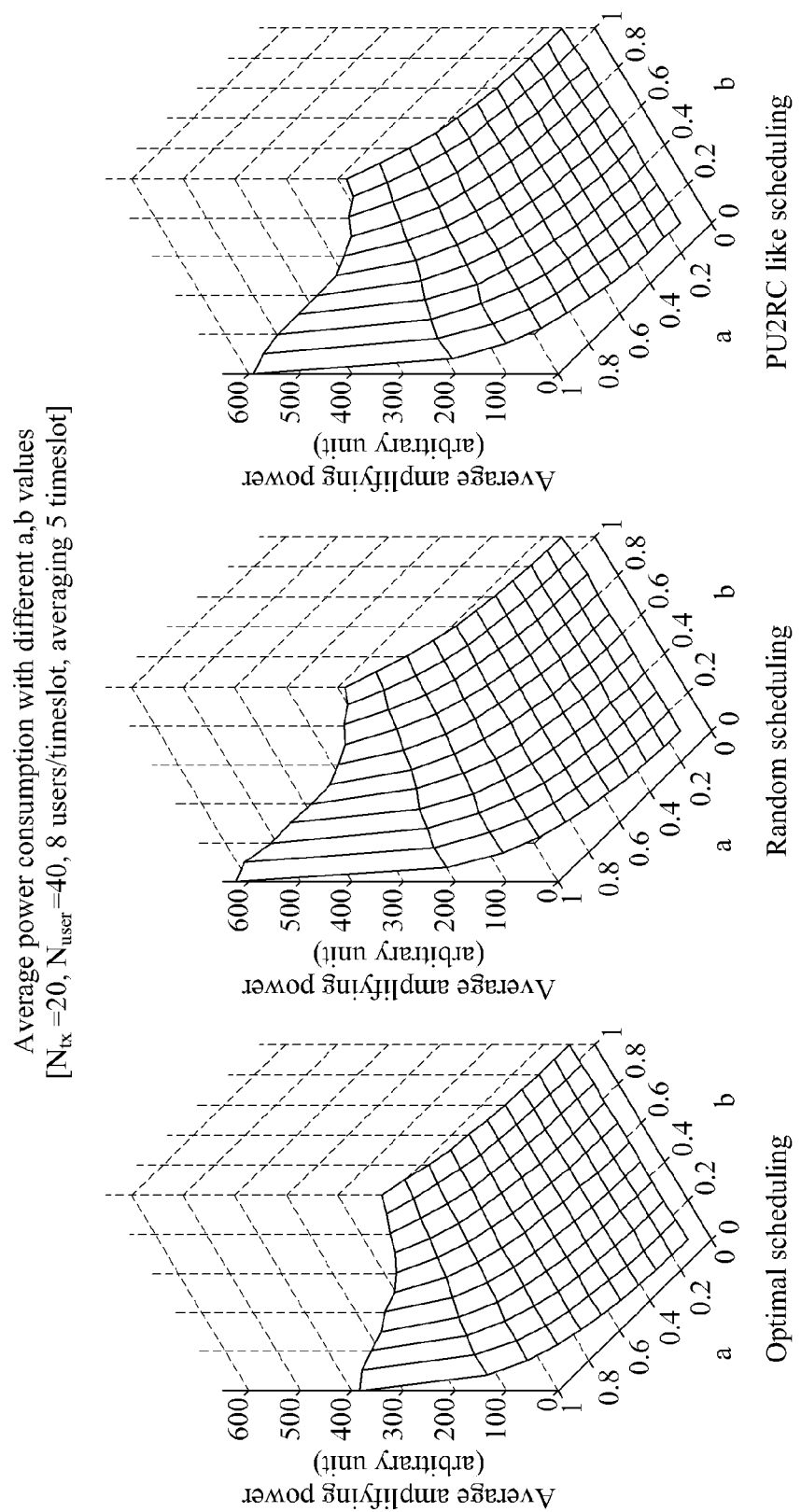
FIG. 13 is a graph illustrating an example of a comparison result with respect to a saving rate of a user scheduling method based on a change in a correlation matrix between antennas installed in a transmission apparatus.

FIG. 13 is a graph illustrating an example of a comparison result with respect to a saving rate of a user scheduling method based on a change in a correlation matrix between antennas installed in a transmission apparatus. That is, FIG. 13 shows an average amplifying power in five time slots used for the simulation of FIG. 12. A power consumption characteristic based on values of elements a and b is known. In addition, when comparing the same points of the values of the elements a and b, an optimal scheduling consumes the smallest power or energy, in comparison to a random scheduling and an PU2RC like scheduling. In addition, when elements of a power correlation matrix $R_T$ are expressed by Equation 11, multiple antennas may need to be designed to decrease the amplitude correlation adjustment element a and to increase the phase correlation adjustment element b in the power correlation characteristic of the multiple antennas, in order to minimize a power consumption.

Figure 14:
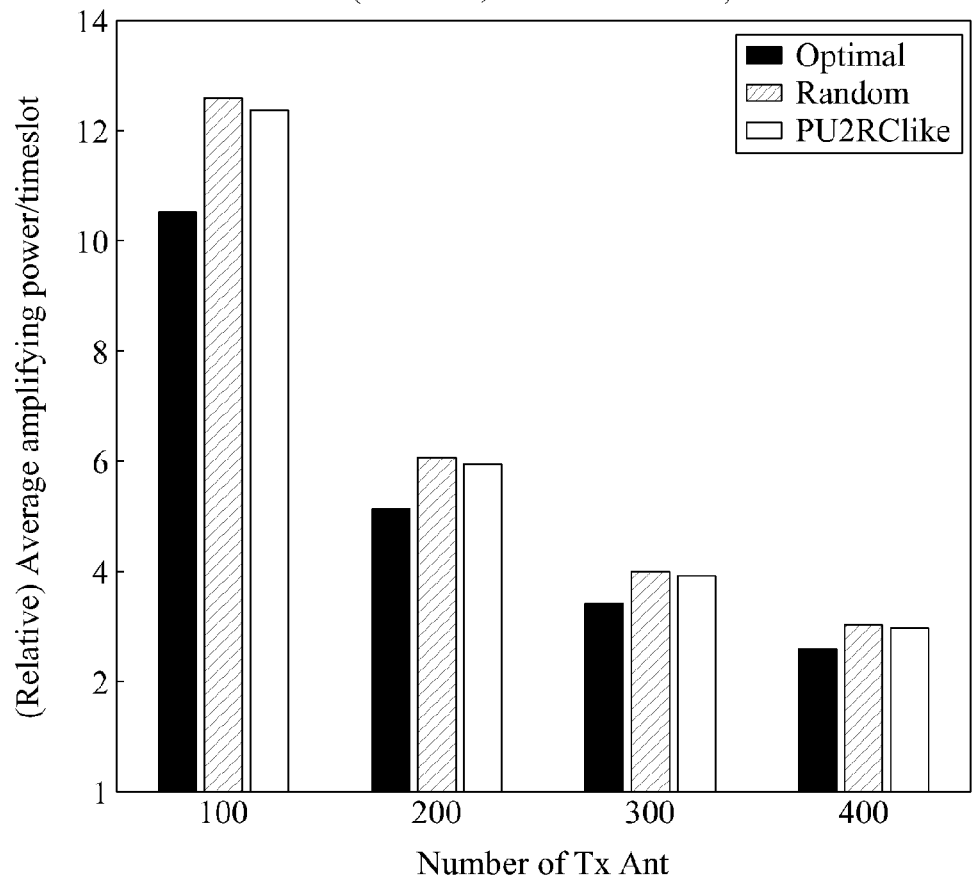
FIG. 14 is a graph illustrating an example of a comparison result with respect to an average power consumption in a massive multiple input multiple output (MIMO) communication system in which a number of antennas installed in a transmission apparatus is 100 or more.

FIG. 14 is a graph illustrating an example of a comparison result with respect to an average power consumption in a massive multiple input multiple output (MIMO) communication system in which a number of antennas installed in a transmission apparatus is 100 or more. In the graph of FIG. 14, an average amplifying power of each scheduling scheme is compared by applying the aforementioned scheme to the massive MIMO communication system. In FIG. 14, at least 100 antennas are installed in the transmission apparatus, and five time slots are generated with respect to a total of 40 user terminals, each time slot including eight user terminals.

When 100 antennas are installed in the transmission apparatus, the average amplifying power of optimal scheduling includes a power consumption gain of about 16.6% compared to random scheduling, and of about 15% compared to PU2RC like scheduling. When 200 antennas are installed in the transmission apparatus, the average amplifying power of the optimal scheduling includes a power consumption gain of about 15.5% compared to random scheduling, and of about 13.7% compared to PU2RC scheduling. Also, when 300 antennas are installed in the transmission apparatus, the average amplifying power of the optimal scheduling includes a power consumption gain of about 14.6% compared to random scheduling, and of about 13% compared to PU2RC scheduling. When 400 antennas are installed in the transmission apparatus, the average amplifying power of the optimal scheduling includes a power consumption gain of about 14.5% compared to random scheduling, and of about 13% compared to PU2RC scheduling.

That is, as the number of antennas installed in the transmission apparatus increases, a gain difference between a power consumption of the optimal scheduling and a power consumption of the other scheduling decreases. FIG. 14 shows that the optimal scheduling exhibits a relatively excellent power consumption even in the massive MIMO communication system.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable recording mediums. The computer readable recording medium may include any data storage device that can store data which can be thereafter read by a computer system or processing device. Examples of the non-transitory computer readable recording medium include read-only memory (ROM), random-access memory (RAM), CD-ROMs, magnetic tapes, floppy disks, optical data storage devices. Also, functional programs, codes, and code segments accomplishing the examples disclosed herein can be easily construed by programmers skilled in the art to which the examples pertain based on and using the flow diagrams and block diagrams of the figures and their corresponding descriptions as provided herein.

As a non-exhaustive illustration only, a terminal described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A scheduling method comprising:
identifying a user group comprising user terminals;
comparing power consumptions based on the user group; and
scheduling the user terminals based on the comparing.

2. The method of claim 1, wherein:
the user group corresponds to a time slot of a frame for transmission of data to the user terminals.

3. The method of claim 1, wherein the comparing comprises:
comparing a power consumption of the identified user group with a power consumption of a modified user group in which a user terminal is replaced in the identified user group.

4. The method of claim 3, wherein the scheduling comprises:
updating the identified user group with the modified user group if the power consumption of the modified user group is less than the power consumption of the identified user group.

5. The method of claim 4, wherein the scheduling further comprises:
setting a flag associated with a group update if the identified user group is updated with the modified user group.

6. A scheduling method comprising:
determining a transmission power to provide data to a user terminal within a coverage area of a base station;
selecting a user group comprising user terminals; and
scheduling the user terminals based on the user group that minimizes the transmission power.

7. The method of claim 6, wherein:
the user group corresponds to a time slot of a frame for transmission of data to the user terminals.

8. The method of claim 6, wherein the scheduling comprises:
comparing a power consumption of the selected user group with a power consumption of a modified user group in which a user terminal is replaced in the selected user group.

9. The method of claim 8, wherein the scheduling further comprises:
updating the selected user group with the modified user group if the power consumption of the modified user group is less than the power consumption of the selected user group.

10. A scheduling apparatus comprising:
a group identifier configured to identify a user group comprising user terminals; and
a scheduler configured to compare power consumptions based on the user group, and schedule the user terminals based on the comparison.

11. The apparatus of claim 10, wherein:
the user group corresponds to a time slot of a frame for transmission of data to the user terminals.

12. The apparatus of claim 10, wherein the scheduler is further configured to:
compare a power consumption of the identified user group with a power consumption of a modified user group in which a user terminal is replaced in the identified user group.

13. The apparatus of claim 12, wherein the scheduler is further configured to:
    update the identified user group with the modified user group if the power consumption of the modified user group is less than the power consumption of the identified user group.

14. The apparatus of claim 13, wherein the scheduler is further configured to:
    set a flag associated with a group update if the identified user group is updated with the modified user group.

15. The apparatus of claim 10, wherein:
    the scheduling apparatus is included in a base station.

16. A scheduling apparatus comprising:
    a transmission power determining unit configured to determine a transmission power to provide data to a user terminal within a coverage area of a base station; and
    a scheduler configured to select a user group comprising user terminals, and schedule the user terminals based on the user group that minimizes the transmission power.

17. The apparatus of claim 16, wherein:
    the user group corresponds to a time slot of a frame for transmission of data to the user terminals.

18. The apparatus of claim 16, wherein the scheduler is further configured to:
    compare a power consumption of the selected user group with a power consumption of a modified user group in which a user terminal is replaced in the selected user group.

19. The apparatus of claim 18, wherein the scheduler is further configured to:
    update the selected user group with the modified user group if the power consumption of the modified user group is less than the power consumption of the selected user group.

20. The apparatus of claim 16, wherein:
    the scheduling apparatus is included in the base station.

* * * * *